United States Patent
Miyamoto et al.

(10) Patent No.: US 8,397,609 B2
(45) Date of Patent: Mar. 19, 2013

(54) MACHINING METHOD AND MACHINING SYSTEM

(75) Inventors: Satoshi Miyamoto, Yamatokoriyama (JP); Ryuichi Fujiwara, Yamatokoriyama (JP); Shizuo Nishikawa, Yamatokoriyama (JP); Hisayoshi Morita, Yamatokoriyama (JP)

(73) Assignee: Mori Seiki Co., Ltd., Nara (JP)

( * ) Notice: Subject to any disclaimer, the term of this patent is extended or adjusted under 35 U.S.C. 154(b) by 544 days.

(21) Appl. No.: 12/776,447

(22) Filed: May 10, 2010

(65) Prior Publication Data

US 2010/0288088 A1 Nov. 18, 2010

(30) Foreign Application Priority Data

May 15, 2009 (JP) ................................. 2009-118456

(51) Int. Cl.
*B23B 1/00* (2006.01)
*B23B 7/00* (2006.01)

(52) U.S. Cl. .............................. 82/1.11; 82/118; 82/151

(58) Field of Classification Search .................... 82/1.11, 82/113, 114, 118, 117, 142, 151, 903; 29/407.01, 29/407.04; 700/175, 95, 195; 382/152
See application file for complete search history.

(56) References Cited

U.S. PATENT DOCUMENTS

| | | | | |
|---|---|---|---|---|
| 4,031,368 A | * | 6/1977 | Colding et al. | 700/173 |
| 4,576,482 A | * | 3/1986 | Pryor | 356/612 |
| 5,479,353 A | * | 12/1995 | Nakamura | 700/175 |
| 5,841,542 A | * | 11/1998 | Milana et al. | 356/635 |
| 5,917,726 A | * | 6/1999 | Pryor | 700/95 |
| 6,161,055 A | * | 12/2000 | Pryor | 700/175 |
| 6,415,191 B1 | * | 7/2002 | Pryor | 700/95 |
| 7,206,657 B2 | * | 4/2007 | Esterling | 700/175 |

FOREIGN PATENT DOCUMENTS

| | | |
|---|---|---|
| GB | 1601571 A | 10/1981 |
| JP | 07100736 A * | 4/1995 |
| JP | 2004-261935 | 9/2004 |
| JP | 2004261935 A | 9/2004 |
| SU | 795858 A1 | 1/1981 |
| WO | WO03/057400 A1 | 7/2003 |

OTHER PUBLICATIONS

European Search Report dated Jun. 8, 2010 for EP 10162110.0, which is a corresponding European application, that cites JP2004261935A, GB1601571A, WO03057400A1, and SU795858A1.

* cited by examiner

*Primary Examiner* — Will Fridie, Jr.
(74) *Attorney, Agent, or Firm* — WPAT, P.C.; Anthony King (57) ABSTRACT

A machining system 1 comprises a lathe 10 having end portion supporting mechanisms 13, 15 for supporting an elongated workpiece W horizontally, center rests 21 for supporting the middle portion of the workpiece W, an adjustment mechanism for adjusting the supported position of the workpiece W by adjusting the height positions of the center rests 21, a tool rest 20, and a control device 25, and a non-contact measuring device 30 for measuring the deflection amount of the workpiece W at portions thereof supported by the center rests 21 when the workpiece W is rotated. The control device 25 is configured to adjust the height positions of the center rests 21 by controlling the adjustment mechanism on the basis of the measured deflection amount, so that the height positions of both end portions of the workpiece W being rotated and the middle portion thereof become the same.

5 Claims, 5 Drawing Sheets

MACHINING METHOD AND MACHINING SYSTEM

TECHNICAL FIELD

The present invention relates to a machining method and machining system in which both end portions of an elongated workpiece are supported horizontally by end portion supporting means and the middle portion of the workpiece is supported by middle portion supporting means, and the supported workpiece is rotated about its axis and is machined by a tool held by tool holding means.

BACKGROUND ART

In a machining device such as a lathe, when an elongated workpiece is machined, the middle portion of the workpiece, as well as both end portions thereof, is supported to prevent the middle portion from being deflected by its own weight.

As such a machining device, conventionally, for example, a device disclosed in Japanese Unexamined Patent Application Publication No. 2004-261935 has been known. In this machining device, one end portion of a workpiece is supported by a spindle of a fixed headstock while the other end portion thereof is supported by a spindle of a sliding headstock, and the middle portion thereof is supported by a center rest.

SUMMARY OF INVENTION

Technical Problem

Figure 7:
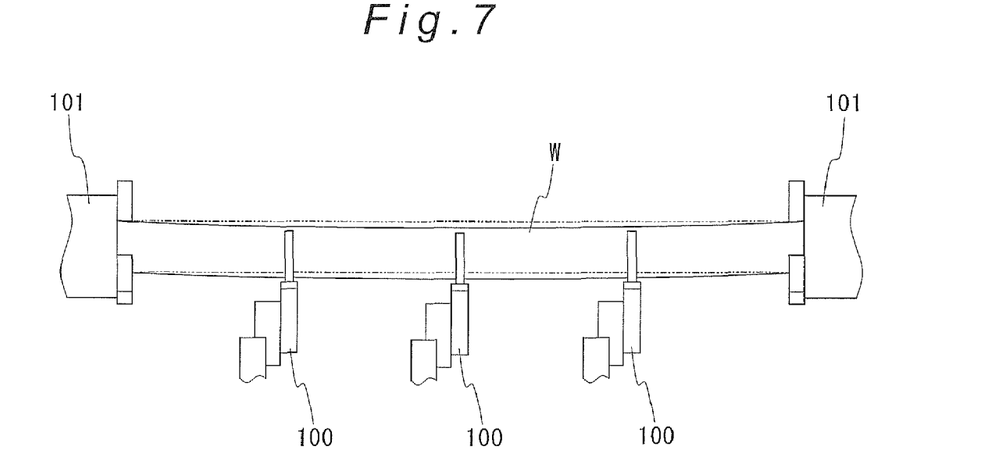
FIG. 7 is an illustration for illustrating a conventional way of supporting the middle portion of the workpiece.
Figure 8:
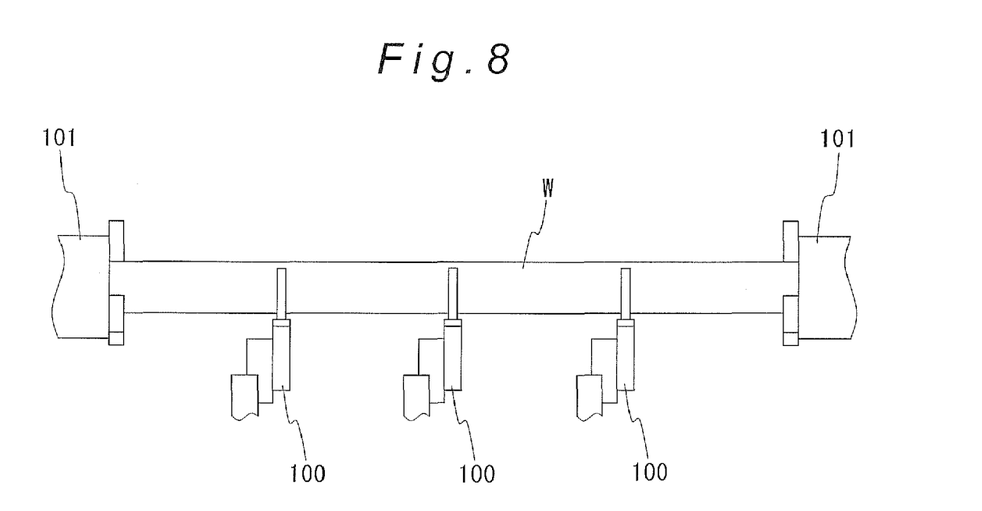
FIG. 8 is an illustration for illustrating the conventional way of supporting the middle portion of the workpiece.

By the way, in a case where the middle portion of a workpiece W is supported by center rests 100, the height position of each center rest 100 is adjusted so that the center position of the workpiece W at the portion thereof supported by the center rest 100 coincides with the axes of spindles of a fixed headstock and sliding headstock. Thereby, the workpiece W which is deflected as shown in FIG. 7 becomes straight as shown in FIG. 8. Conventionally, such adjustment has been performed in a state where the workpiece W is not being rotated. It is noted that in FIGS. 7 and 8, reference numerals 101 refer to chucks mounted to the spindles.

However, as a result of repeated research, the inventors and others have learned that there is a difference in the deflection state of the workpiece W between when the workpiece W is being rotated and when the workpiece W is not being rotated. Therefore, it is preferable to, when the workpiece W is being rotated for machining, adjust the height position of each center rest 100 and thereby adjust the supported position in the vertical direction of the workpiece W to performing such adjustment when the workpiece W is not being rotated as described above.

The present invention has been achieved in view of the above-described circumstances, and an object of the present invention is to provide a machining method and machining system capable of more precisely adjusting the supported height of the middle portion of the workpiece.

Solution to Problem

The present invention, for achieving the above-described object, relates to a machining method in which both end portions of an elongated workpiece are supported horizontally by end portion supporting means and the middle portion of the workpiece is supported by middle portion supporting means, and the supported workpiece is rotated about its axis and is machined by a tool held by tool holding means, the machining method characterized in that:

first, the workpiece is supported by the supporting means and a measuring head for measuring the distance between the measuring head and the outer peripheral surface of the workpiece without contact is attached to the tool holding means;

subsequently, the workpiece is rotated about its axis at a rotational speed for when the workpiece is machined and the distance between the measuring head and the outer peripheral surface of the workpiece is measured by the measuring head, and the deflection amount of the workpiece at the portion thereof supported by the middle portion supporting means is calculated;

thereafter, on the basis of the calculated deflection amount, the workpiece supporting position in the vertical direction of the middle portion supporting means is adjusted so that the height positions of both end portions of the workpiece being rotated and the height position of the middle portion thereof become the same; and then the workpiece is machined by the tool held by the tool holding means.

This machining method can be preferably performed by a machining system described below. That is, the machining system comprises a machining device for machining an elongated workpiece supported horizontally and a non-contact measuring device for measuring the deflection of a workpiece to be machined by the machining device, and the machining system is configured so that:

the machining device has end portion supporting means for supporting both end portions of the workpiece horizontally, middle portion supporting means for supporting the middle portion of the workpiece supported by the end portion supporting means, adjustment means for adjusting the height position of the middle portion supporting means and thereby adjusting the workpiece supporting position in the vertical direction of the middle portion supporting means, rotation drive means for rotating the workpiece supported by the supporting means about its axis, tool holding means which is provided so as to be movable in three orthogonal directions, a Z-axis parallel to the axis of the workpiece, an X-axis orthogonal to the Z-axis, a Y-axis orthogonal to both of the Z-axis and X-axis, and holds a tool, feed means for moving the tool holding means, and control means for controlling operations of the adjustment means, rotation drive means and feed means;

the non-contact measuring device has a measuring head which is configured so as to be attachable to and detachable from the tool holding means and measures, without contact, the distance between the measuring head and the outer peripheral surface of the workpiece being supported by the supporting means and being rotated by the rotation drive means at a rotational speed for when the workpiece is machined, and deflection amount calculating means for calculating the deflection amount of the workpiece at the portion thereof supported by the middle portion supporting means on the basis of the distance measured by the measuring head and the position of the tool holding means when said distance was measured which is obtained from the control means; and the control means controls the adjustment means on the basis of the deflection amount calculated by the deflection amount calculating means, thereby adjusting the height position of the middle portion supporting means so that the height positions of both end portions of the workpiece being rotated and the height position the middle portion thereof become the same.

According to this machining system, in machining a workpiece supported by the supporting means, first the deflection amount of the workpiece supported by the supporting means is calculated. This deflection amount is the deflection amount of the workpiece occurring when the workpiece is being rotated, and is calculated in the following manner.

That is, the workpiece supported by the supporting means is rotated by the rotation drive means about its axis at the same rotational speed for when the workpiece is machined, and the distance between the measuring head and the outer peripheral surface of the workpiece being rotated is measured by the measuring head without contact. Thereafter, the deflection amount of the workpiece at the portion thereof supported by the middle portion supporting means is calculated on the basis of the measured distance and the position of the tool holding means when the distance was thus measured which is obtained from the control means.

The adjustment means is controlled by the control means on the basis of the calculated deflection amount, and thereby the height position of the middle portion of the workpiece is adjusted, so that the height positions of both end portions of the workpiece being rotated and the height position of the middle portion thereof become the same.

Once the supported position of the middle portion of the workpiece is adjusted in this way, a predetermined tool is held by the tool holding means and the workpiece is machined by the tool.

Thus, according to the machining method and machining system of the present invention, the workpiece is rotated at a rotational speed for when the workpiece is machined and the deflection amount of the workpiece at this time is calculated, and the supported position of the middle portion of the workpiece is adjusted in a state where the workpiece is being rotated. Therefore, it is possible to calculate the same deflection amount as the deflection amount of the workpiece occurring when the workpiece is actually machined and adjust the supported position of the middle portion of the workpiece on the basis of the calculated deflection amount. Therefore, it is possible to accurately machine the workpiece even in a case where there is a difference in the deflection state of the workpiece between when the workpiece is being rotated and when the workpiece is not being rotated.

Further, since a non-contact type measuring head is employed, it is possible to perform the measurement with the workpiece being rotated, which cannot be performed by a contact-type measuring device using a touch probe or the like.

The measuring head may be configured with light emitting means for emitting a laser beam toward the outer peripheral surface of the workpiece, light receiving means for receiving the laser beam reflected by the outer peripheral surface of the workpiece, and distance calculating means for calculating the distance between the measuring head and the outer peripheral surface of the workpiece on the basis of received-light data of the light receiving means.

Further, the light emitting means may be configured to emit a laser beam in the Y-axis direction. In this case, the measuring head is configured to be moved in the X-axis direction by the tool holding means moving in the X-axis direction and measure said distance at a plurality of positions in its moving direction, and the deflection amount calculating means is configured to calculate the center position of the workpiece on the basis of the distances measured by the measuring head and the positions of the tool holding means when said distances were measured which are obtained from the control means and then calculate the deflection amount. In this case, the deflection amount of the workpiece can be calculated from the center position of the workpiece. In calculating the center position of the workpiece, it can be calculated from the positions of a plurality of measurement points on the outer peripheral surface of the workpiece or from the positions of a plurality of measurement points on the outer peripheral surface of the workpiece and the diameter of the workpiece which is known in advance.

Furthermore, the light emitting means may be configured to emit a laser beam in vertical direction. In this case, the measuring head is configured to measure the distance between the measuring head and the upper outer peripheral surface of the workpiece.

In calculating the deflection amount of the workpiece, the deflection amount of the workpiece at the portion thereof supported by the middle portion supporting means may be calculated directly. Alternatively, it may be configured so that first the center position of the workpiece or the position of the upper outer peripheral surface of the workpiece is calculated at positions at predetermined intervals in the direction of the workpiece axis and the deflection shape of the entire workpiece is calculated from the obtained plurality of center positions of the workpiece or the obtained plurality of positions of the upper outer peripheral surface of the workpiece, and then, on the basis of the thus calculated deflection shape of the entire workpiece and the workpiece supporting position in the direction of the workpiece axis of the middle portion supporting means, the deflection amount of the workpiece at the workpiece supporting position is calculated.

The middle position of the workpiece refers to not only the center in the direction of the workpiece axis but the portion between one end portion and the other end portion of the workpiece. In addition, the number of the middle portion supporting means arranged may be one or plural.

Advantageous Effects of Invention

As described above, according to the machining method and machining system of the present invention, since the deflection amount of the workpiece is calculated in a state where the workpiece is being rotated at the same rotational speed as that for when the workpiece is machined, it is possible to calculate the same deflection amount as the deflection amount occurring when the workpiece is machined, and thereby the middle portion of the workpiece can be supported so that it is not deflected when being machined. Therefore, it is possible to highly accurately machine the workpiece.

DESCRIPTION OF EMBODIMENTS

Figure 1:
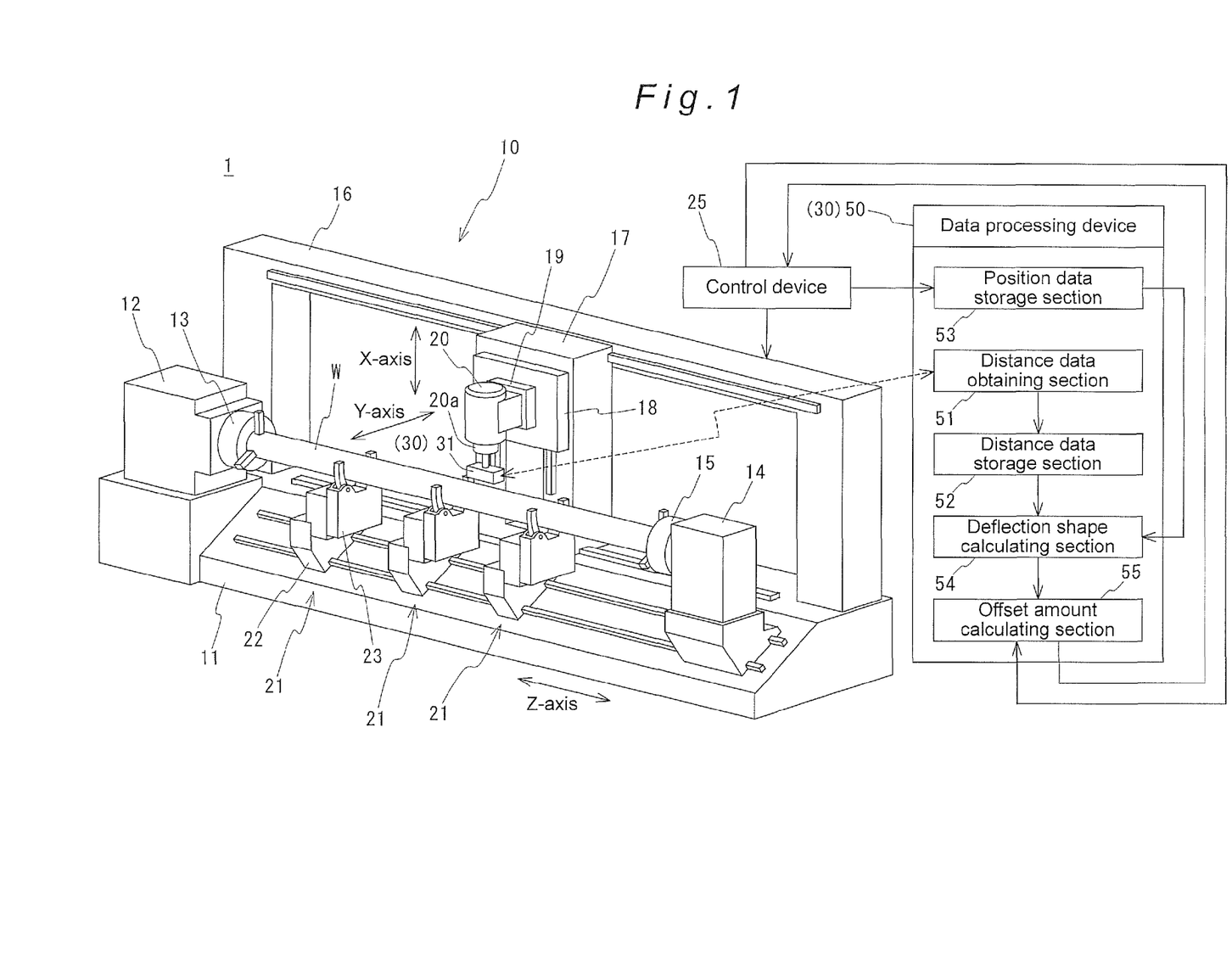
FIG. 1 is a perspective view showing a schematic configuration of a machining system according to one embodiment of the present invention, which is partially represented by block diagram.
Figure 2:
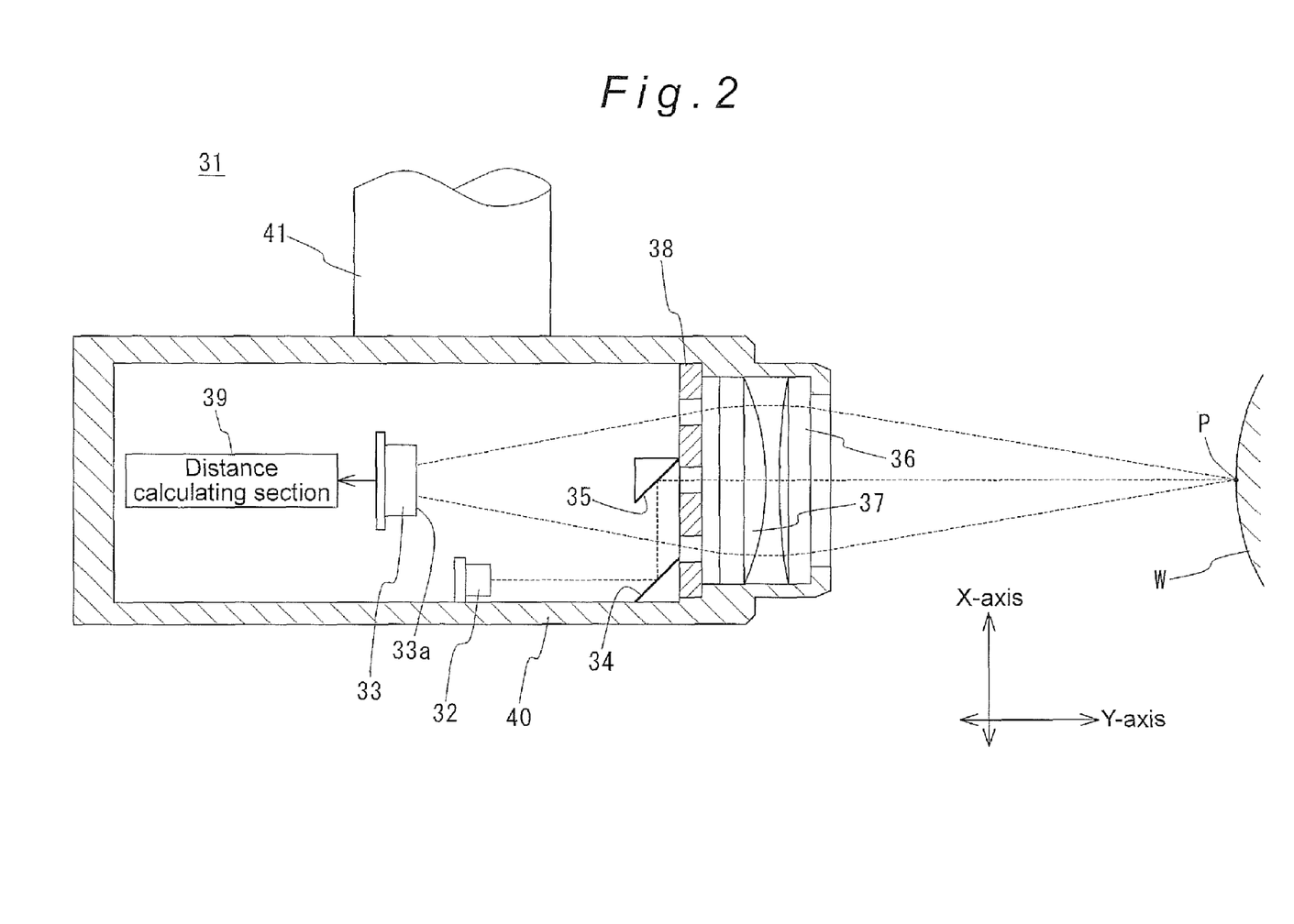
FIG. 2 is a sectional view showing a schematic configuration of a measuring head according to the embodiment.

Hereinafter, a specific embodiment of the present invention will be explained with reference to the accompanying drawings. FIG. 1 is a perspective view showing a schematic configuration of a machining system according to one embodiment of the present invention, which is partially represented by block diagram, and FIG. 2 is a sectional view showing a schematic configuration of a measuring head according to the embodiment.

As shown in FIG. 1, a machining system 1 of the present embodiment is configured with a lathe 10 as a machining device and a laser-type measuring device 30 for measuring the deflection of a workpiece W to be machined by the lathe 10, and is configured to, in the lathe 10, adjust the position at which the workpiece W is supported by center rests 21 on the basis of the deflection of the workpiece W measured by the laser-type measuring device 30.

The lathe 10 is configured with a bed 11, a first headstock 12 fixedly provided on the bed 11, a first spindle (not shown) supported by the first headstock 12 so as to be rotatable about its horizontal axis, a first chuck 13 mounted to the tip of the first spindle for holding one end portion of the workpiece W horizontally, a second headstock 14 disposed on the bed 11 so as to face the first headstock 12 and so as to be movable in a Z-axis direction that is the direction of the axis of the first spindle (not shown), a second spindle (not shown) supported by the second headstock 14 so as to be co-axial with the axis of the first spindle and so as to be rotatable about its axis, a second chuck 15 mounted to the tip of the second spindle for holding the other end portion of the workpiece W horizontally, a column 16 fixedly provided on the bed 11, a first saddle 17 supported at the upper portion thereof by the column 16 and at the lower portion thereof by the bed 11 and provided so as to be movable in the Z-axis direction, a second saddle 18 disposed on the first saddle 17 so as to be movable in an X-axis direction that is the vertical direction, a quill 19 disposed on the second saddle 18 so as to be movable in a Y-axis direction that is orthogonal to both of the Z-axis and X-axis, a tool rest 20 supported on the front end face of the quill 19, a plurality of center rests 21 which are disposed on the bed 11 between the first headstock 12 and the second headstock 14 so as to be movable in the Z-axis direction and the X-axis direction and support the middle portion of the workpiece W, and other components.

In addition, although not particularly shown, the lathe 10 is provided with a rotation drive mechanism for rotating the first spindle about its axis, a first Z-axis feed mechanism for moving the second headstock 14 in the Z-axis direction, a second Z-axis feed mechanism for moving the first saddle 17 in the Z-axis direction, a first X-axis feed mechanism for moving the second saddle 18 in the X-axis direction, a Y-axis feed mechanism for moving the quill 19 in the Y-axis direction, and a third Z-axis feed mechanism and second X-axis feed mechanism provided corresponding to each center rest 21 for moving the center rest 21 in the Z-axis direction and in the X-axis direction, respectively, as well as a control device 25 for controlling their operations. Each of the feed mechanisms is configured with a drive motor, a ball screw, a nut and other components.

The tool rest 20 has a tool spindle 20a supported so as to be rotatable about its axis and a drive motor (not shown) for rotating the tool spindle 20a about its axis, and a tool (not shown) is held by the tool spindle 20a.

Each of the center rest 21 is configured with a sliding carriage 22 disposed on the bed 11 so as to be movable in the Z-axis direction and a center rest body 23 which is disposed on the sliding carriage 22 so as to be movable in the X-axis direction and which supports the workpiece W. The sliding carriage 22 is driven by the third Z-axis feed mechanism and the center rest body 23 is driven by the second X-axis feed mechanism. It is noted that the second X-axis feed mechanism corresponds to the adjustment means recited in the claims. The second X-axis feed mechanism adjusts the height position of the center rest body 23 by moving it in the X-axis direction, and thereby the supported position in the vertical direction of the workpiece W is adjusted.

The control device 25 adjusts the height position of each center rest body 23 by controlling the second X-axis feed mechanism on the basis of the offset amount calculated by a later-described offset amount calculating section 55. Thereby, the height positions of both end portions of the workpiece W being rotated at the same rotational speed as that for when the workpiece W is machined and the height positions of the portions thereof supported by the center rest bodies 23 become the same.

The laser-type measuring device 30 is configured with a measuring head 31 for measuring the distance between the measuring head 31 and the outer peripheral surface of the workpiece W being rotated at the same rotational speed as that for when the workpiece W is machined and a data processing device 50 for calculating the deflection amount of the workpiece W on the basis of data (distance data) on the distance measured by the measuring head 31 etc.

The measuring head 31 includes a laser oscillator 32 for emitting a laser beam in the Y-axis direction toward the outer peripheral surface of the workpiece W, a CCD camera 33 for receiving the laser beam reflected by the outer peripheral surface of the workpiece W and generating two-dimensional image data, a prism 34 and reflecting mirror 35 for directing the laser beam from the laser oscillator 32 to the outer peripheral surface of the workpiece W, two convex lenses 36, 37 for forming an image of the laser beam reflected by the outer peripheral surface of the workpiece W on an image plane 33a of the CCD camera 33 (specifically, concentrating the laser beam as an annular image), a diaphragm 38 arranged between the CCD camera 33 and the convex lens 37, a distance calculating section 39 for calculating the distance in the Y-axis direction between the measuring head 31 and the outer peripheral surface of the workpiece W (the distance between the image plane 33a of the CCD camera 33 and an irradiation point P of the laser beam) on the basis of the two-dimensional image data generated by the CCD camera 33, a transmitting device (not shown) for transmitting the distance data calculated by the distance calculating section 39 to the data processing device 50 by a wireless communication, a casing 40 for holding the laser oscillator 32, the CCD camera 33, the prism 34, the reflecting mirror 35, the convex lenses 36, 37, the diaphragm 38, the distance calculating section 39, the transmitting device etc. therein, and a mounting member 41 fixedly provided on the upper face of the casing 40 and being attachable to and detachable from the tool spindle 20a.

The distance calculating section 39 extracts the annular image of the reflected laser beam on the basis of the two-dimensional image data generated by the CCD camera 33, recognizes the diameter of the annular image, and calculates the distance between the image plane 33a and the irradiation point P from the recognized diameter.

Figure 3:
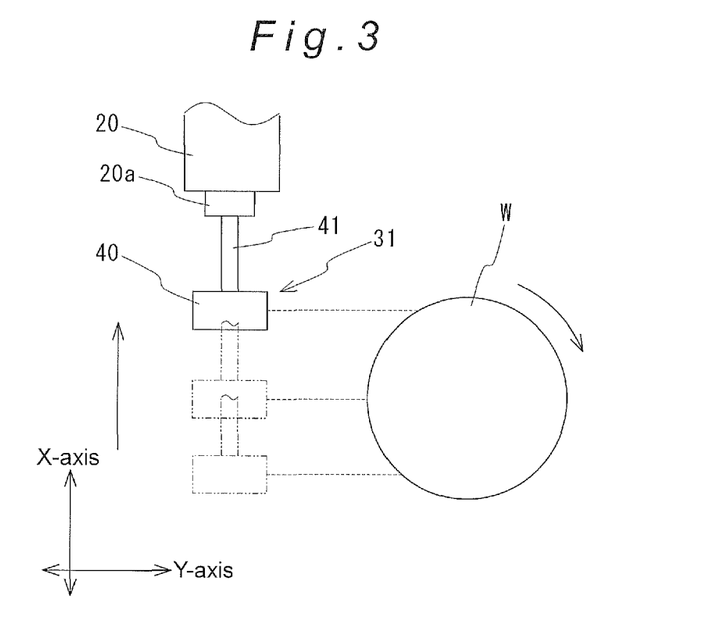
FIG. 3 is an illustration for illustrating measurement of the distance between the measuring head and the outer peripheral surface of a workpiece in the embodiment.
Figure 4:
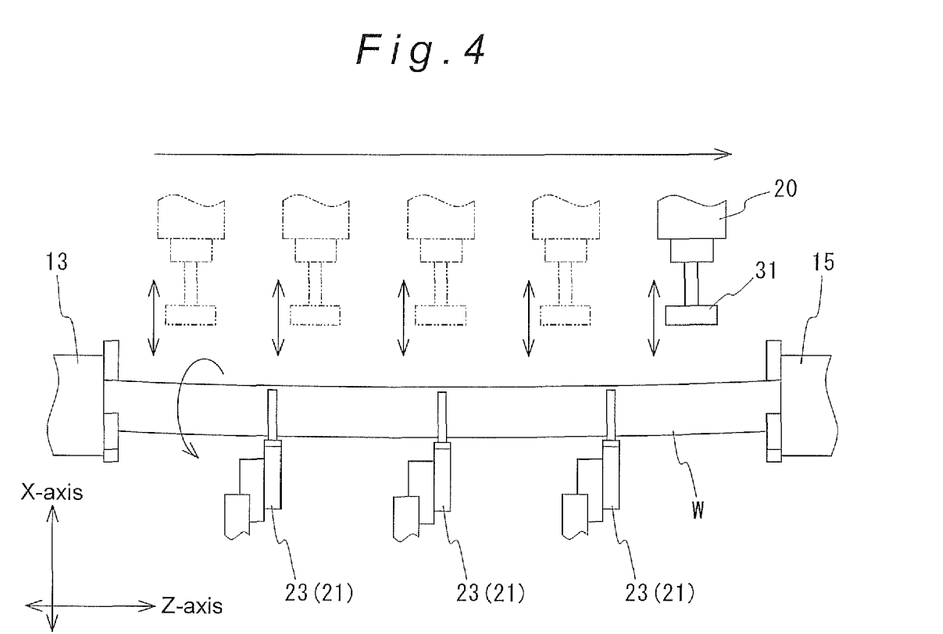
FIG. 4 is an illustration for illustrating the measurement of the distance between the measuring head and the outer peripheral surface of the workpiece in the embodiment.

The measuring head 31 is, in a state of being attached to the tool spindle 20a, moved in the X-axis direction by the movement of the tool rest 20 in the X-axis direction as shown in FIG. 3, for example. And the measuring head 31 measures said distance at a plurality of positions in its moving direction. Such measurement is performed at each of a plurality of measurement positions which are set in the direction of the axis of the workpiece W as shown in FIG. 4.

The data processing section 50 has a distance data obtaining section 51 for obtaining the distance data by receiving the distance data transmitted from the measuring head 31 by a wireless communication, a distance data storage section 52 for storing the distance data obtained by the distance data obtaining section 51, a position data storage section 53 for storing moving position data on a moving position in the X-axis, Y-axis and Z-axis directions of the tool rest 20 which is obtained from the control device 25, a deflection shape calculating section 54 for calculating the deflection shape of the entire workpiece W on the basis of the data stored in the distance data storage section 52 and in the position data storage section 53, and an offset amount calculating section 55 for calculating the offset amount on the basis of the deflection shape calculated by the deflection shape calculating section 54. It is noted that the deflection shape calculating section 54 and the offset amount calculating section 55 correspond to the deflection amount calculating means recited in the claims.

In the position data storage section 53, moving position data on the moving position of the tool rest 20 when the distance between the outer peripheral surface of the workpiece W and the CCD camera 33 is measured (for example, when a laser beam is emitted from the laser oscillator 32, when a shutter of the CCD camera 33 is released etc.) is stored.

The deflection shape calculating section 54 first calculates the position in the X-axis, Y-axis and Z-axis directions of each irradiation point P on the basis of a group of data which is the data stored in the distance data storage section 52 and in the position data storage section 53 and which is obtained through the movement of the measuring head 31 in the X-axis direction, and then calculates the center position of the workpiece W on the basis of the calculated positions of the irradiation points P. The calculation of the center position of the workpiece W is performed with respect to each measurement position. In calculating the center position of the workpiece W, it may be calculated on the basis of only the positions of the irradiation points P or on the basis of the positions of the irradiation points P and the diameter of the workpiece W which is known in advance.

Here, an example of a manner of calculating the center position of the workpiece W from the calculated positions of a plurality of irradiation points P (n irradiation points P) will be briefly explained. First of all, the equation for a sphere of radius r centered at $\alpha, \beta, \gamma$ is given as Equation 1, and then $\alpha, \beta, \gamma, r$ are defined as Equation 2. At this time, Equation 1 can be represented as Equation 3.

$$(X-\alpha)^2+(Y-\beta)^2+(Z-\gamma)^2=r^2 \qquad \text{Equation 1}$$

$$\alpha = -(a/2),$$
$$\beta = -(b/2),$$
$$\gamma = -(c/2),$$
Equation 2

$$r = \sqrt{\frac{a^2+b^2+c^2}{4} - d}$$

$$X^2+Y^2+Z^2+aX+bY+cZ+d=0 \qquad \text{Equation 3}$$

When the equation in Equation 3 is partially differentiated with respect to each of a, b, c, d, Equation 4 can be obtained and Equation 5 can be obtained from Equation 4. Values of a, b, c, d are calculated from Equation 5, and when the values are substituted for Equation 2, the center position $\alpha, \beta, \gamma$ and the radius r are obtained. The center position of the workpiece W can be calculated in this way.

$$\Sigma(X^2+Y^2+Z^2+aX+bY+cZ+d)\times X=0$$
$$\Sigma(X^2+Y^2+Z^2+aX+bY+cZ+d)\times Y=0$$
$$\Sigma(X^2+Y^2+Z^2+aX+bY+cZ+d)\times Z=0$$
$$\Sigma(X^2+Y^2+Z^2+aX+bY+cZ+d)\times 1=0 \qquad \text{Equation 4}$$

$$\begin{pmatrix} \Sigma X^2 & \Sigma XY & \Sigma ZX & \Sigma X \\ \Sigma XY & \Sigma Y^2 & \Sigma ZY & \Sigma Y \\ \Sigma ZX & \Sigma YZ & \Sigma Z^2 & \Sigma Z \\ \Sigma X & \Sigma Y & \Sigma Z & n \end{pmatrix} \begin{pmatrix} a \\ b \\ c \\ d \end{pmatrix} = \begin{pmatrix} -\Sigma\ (X^2+Y^2+Z^2)\ X \\ -\Sigma\ (X^2+Y^2+Z^2)\ Y \\ -\Sigma\ (X^2+Y^2+Z^2)\ Z \\ -\Sigma\ (X^2+Y^2+Z^2) \end{pmatrix} \qquad \text{Equation 5}$$

On the basis of the calculated center positions of the workpiece W at the measurement positions, the deflection shape of the entire workpiece W is calculated. This deflection shape can be obtained by, for example, calculating the deflection curve.

The offset amount calculating section 55 calculates the deflection amount of the workpiece W at each of the portions thereof supported by the center rest bodies 23 on the basis of the deflection shape of the entire workpiece W calculated by the deflection shape calculating section 54 and the positions in the Z-axis direction of the portions of the workpiece W supported by the center rest bodies 23. On the basis of the calculated deflection amount, the offset amount (adjustment amount) of the height position of each center rest body 23 is calculated.

According to the machining system 1 of the present embodiment configured as described above, a workpiece W is machined in a manner described below. That is, first both end portions of the workpiece W are gripped by the chucks 13, 15, respectively and the middle portion of the workpiece W is supported by the center rests 21, and the measuring head 31 is attached to the tool spindle 20a of the tool rest 20.

Subsequently, the workpiece W is rotated about its axis at the same rotational speed as that for when the workpiece W is machined. Thereafter, the measuring head 31 is moved to the measurement positions in turn, and at each measurement position the measuring head 31 is moved in the X-axis direction and the laser beam is scanned in the same direction. At a plurality of positions in the X-axis direction, the distance between the outer peripheral surface of the workpiece W and the measuring head 31 is measured.

Then, on the basis of the thus measured distances and the moving positions of the tool rest 20 when the distances were measured, the deflection shape calculating section 54 calculates the position in the X-axis, Y-axis and Z-axis directions of each irradiation point P of the laser beam, calculates the center position of the workpiece W therefrom, and then calculates the deflection shape of the entire workpiece W.

Once the deflection shape of the entire workpiece W is calculated, on the basis of the calculated deflection shape, the offset amount calculating section 55 calculates the deflection amount of the workpiece W at each of the portions thereof supported by the center rest bodies 23, and then calculates the offset amount. On the basis of the calculated offset amount, the control device 25 adjusts each of the positions at which the workpiece W is supported by center rest bodies 23, and thereby, for example, as shown in FIG. 8, the height positions of both end portions of the workpiece W being rotated and the height position of the middle portion thereof become the same.

Once the supported position of the workpiece W is adjusted in this way, the measuring head 31 is detached from the tool spindle 20a of the tool rest 20, and then a predetermined tool is attached thereto and the workpiece W being rotated is machined by the tool. Before actual machining of the workpiece W, the deflection amount of the workpiece W may be recalculated to check whether the deflection has disappeared. In a case where the workpiece W is still deflected, the position of each center rest body 23 is readjusted.

Thus, according to the machining system 1 of the present embodiment, the workpiece W is rotated at a rotational speed for when the workpiece W is machined and the deflection amount of the workpiece W at this time is calculated, and the supported position of the middle portion of the workpiece W is adjusted in a state where the workpiece W is being rotated. Therefore, it is possible to calculate the same deflection amount as the deflection amount of the workpiece W occurring when the workpiece W is actually machined and adjust the supported position of the middle portion of the workpiece W on the basis of the calculated deflection amount. Therefore, it is possible to accurately machine the workpiece W even in a case there is a difference in the deflection state of the workpiece W between when the workpiece W is being rotated and when the workpiece W is not being rotated.

Further, since a non-contact type measuring head 31 is employed, it is possible to perform the measurement with the workpiece W being rotated, which cannot be performed by a contact-type measuring device using a touch probe or the like.

Thus, one embodiment of the present invention has been explained. However, a specific mode in which the present invention can be realized is not limited thereto.

Figure 5:
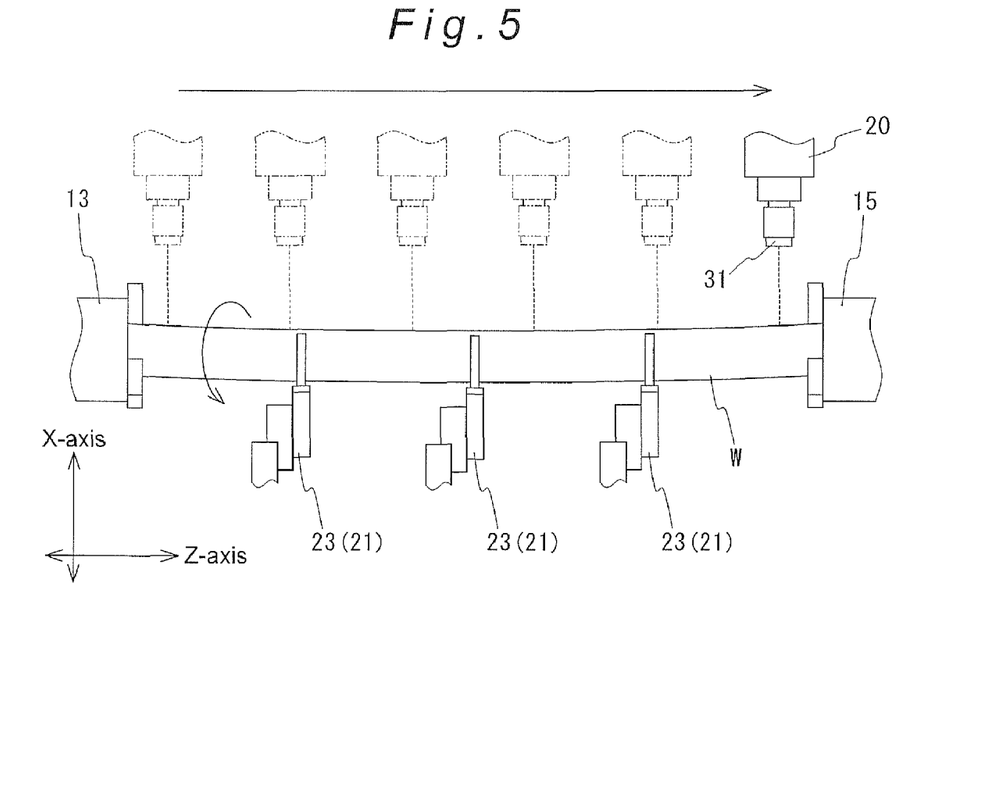
FIG. 5 is an illustration for illustrating measurement of the distance between the measuring head and the outer peripheral surface of the workpiece in an alternative embodiment of the present invention.

For example, although, in the above embodiment, the measuring head 31 is moved to the measurement positions in turn and at each measurement point the laser beam is scanned in the X-axis direction, it is not limited thereto. As shown in FIG. 5, it is may be configured so that the measuring head 31 emits a laser beam in the X-axis direction toward the upper outer peripheral surface of the workpiece W and the laser beam is scanned in the direction of the axis of the workpiece W (in the Z-axis direction).

In this case, the measuring head 31 emits a laser beam at positions at regular intervals toward the upper outer peripheral surface of the workpiece W while moving in the direction of the axis of the workpiece W, and measures, at a plurality of positions in the direction of the axis of the workpiece W, the distance between the measuring head 31 and the irradiation point P on the upper outer peripheral surface of the workpiece W. Further, the deflection shape calculating section 54 calculates the position in the X-axis, Y-axis and Z-axis directions of each irradiation point P on the basis of the data stored in the distance data storage section 52 and in the position data storage section 53, and calculates the deflection shape of the entire workpiece W (the deflection shape of the upper outer peripheral surface of the workpiece W) on the basis of the calculated positions of the irradiation points P.

In the above embodiment, the deflection amount of the workpiece W at each of the portions thereof supported by the center rests 21 is calculated after calculating the deflection shape of the entire workpiece W. However, it is not limited thereto, and the deflection amount of the workpiece W at each of the portions thereof supported by the center rests 21 may be calculated directly without calculating the deflection shape of the entire workpiece W. In this case, the deflection amount of the workpiece W at each of the portions thereof supported by the center rests 21 can be obtained by scanning the laser beam in the X-axis direction or emitting a laser beams toward the upper outer peripheral surface of the workpiece W at each of the portions supported by the center rests 21.

Instead of providing a plurality of center rests 21 with the lathe 10, only one center rest 21 may be provided. In this case, this center rest 21 is configured so as to be movable in the direction of the axis of the workpiece W in a state of supporting the workpiece W and the position in the Z-axis and X-axis directions of the center rest 21 is controlled in the following manner.

In this case, first the center rest 21 is moved in the Z-axis direction in a state where the workpiece W is being rotated at a rotational speed for when the workpiece W is machined, and at positions at regular intervals in its moving direction, the deflection amount of the workpiece W at the portion thereof supported by the center rest 21 is calculated and the offset amount in the X-axis direction of the center rest 21 at each position in the Z-axis direction is calculated.

Figure 6:
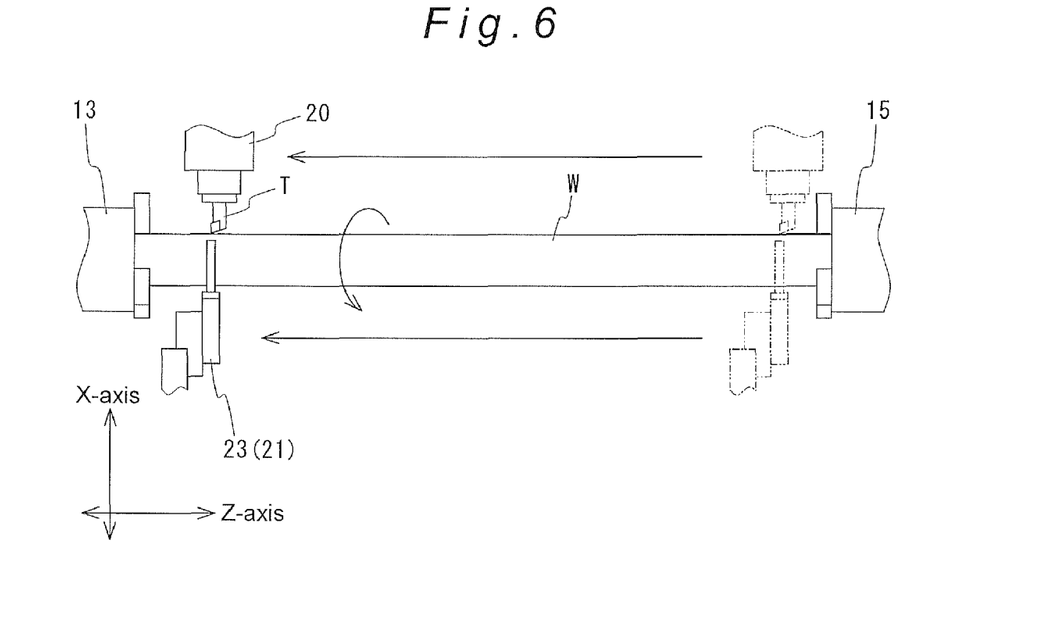
FIG. 6 is an illustration for illustrating a machining method in an alternative embodiment of the present invention.

After the offset amount of the center rest 21 is calculated in this way, the workpiece W is machined. At this time, as shown in FIG. 6, the center rest 21 is moved in the Z-axis direction in response to the movement of a tool T so that the position in the Z-axis direction of the portion of the workpiece W supported by the center rest 21 and the position in the Z-axis direction of a machining point become the same. Further, on the basis of the offset amount of the center rest 21 at the positions in the Z-axis direction, the height position of the center rest 21 is adjusted so that the height positions of both end portions of the workpiece W and the portion thereof supported by the center rest 21 become the same.

When thus configured, since the position in the X-axis direction of the machining point is always the same throughout the direction of the axis of the workpiece W, it is possible to highly accurately machine the workpiece W.

Additionally, although, in the above embodiment, the lathe 10 is provided as an example of the machining device, the machining device may be a grinding machine such as a cylindrical grinding machine. Further, the position data storage section 53 may be provided in the control device 25 instead of in the data processing device 50.

| Reference Signs List | |
|---|---|
| 1 | Machining system |
| 10 | Lathe |
| 13 | First chuck |
| 15 | Second chuck |
| 20 | Tool rest |
| 21 | Center rest |
| 25 | Control device |
| 30 | Laser-type measuring device |
| 31 | Measuring head |
| 32 | Laser oscillator |
| 33 | CCD camera |
| 39 | Distance calculating section |

| Reference Signs List | |
|---|---|
| 50 | Data processing device |
| 54 | Deflection shape calculating section |
| 55 | Offset amount calculating section |

Citation List

Patent Literature

Japanese Unexamined Patent Application Publication No. 2004-261935

The invention claimed is:

1. A machining method in which both end portions of an elongated workpiece are supported horizontally by end portion supporting means and the middle portion of the workpiece is supported by middle portion supporting means, and the supported workpiece is rotated about its axis and is machined by a tool held by tool holding means, the machining method characterized in that:
  first, the workpiece is supported by the supporting means and a measuring head for measuring the distance between the measuring head and the outer peripheral surface of the workpiece without contact is attached to the tool holding means;
  subsequently, the workpiece is rotated about its axis at a rotational speed for when the workpiece is machined and the distance between the measuring head and the outer peripheral surface of the workpiece is measured by the measuring head, and the deflection amount of the workpiece at the portion thereof supported by the middle portion supporting means is calculated;
  thereafter, on the basis of the calculated deflection amount, the workpiece supporting position in the vertical direction of the middle portion supporting means is adjusted so that the height positions of both end portions of the workpiece being rotated and the height position of the middle portion thereof become the same; and
  then the workpiece is machined by the tool held by the tool holding means.

2. A machining system comprising a machining device for machining an elongated workpiece supported horizontally and a non-contact measuring device for measuring the deflection of a workpiece to be machined by the machining device, the machining system characterized in that:
  the machining device has end portion supporting means for supporting both end portions of the workpiece horizontally, middle portion supporting means for supporting the middle portion of the workpiece supported by the end portion supporting means, adjustment means for adjusting the height position of the middle portion supporting means and thereby adjusting the workpiece supporting position in the vertical direction of the middle portion supporting means, rotation drive means for rotating the workpiece supported by the supporting means about its axis, tool holding means which is provided so as to be movable in three orthogonal directions, a Z-axis parallel to the axis of the workpiece, an X-axis orthogonal to the Z-axis, a Y-axis orthogonal to both of the Z-axis and X-axis, and holds a tool, feed means for moving the tool holding means, and control means for controlling operations of the adjustment means, rotation drive means and feed means;
  the non-contact measuring device has a measuring head which is configured so as to be attachable to and detachable from the tool holding means and measures, without contact, the distance between the measuring head and the outer peripheral surface of the workpiece being supported by the supporting means and being rotated by the rotation drive means at a rotational speed for when the workpiece is machined, and deflection amount calculating means for calculating the deflection amount of the workpiece at the portion thereof supported by the middle portion supporting means on the basis of the distance measured by the measuring head and the position of the tool holding means when said distance was measured which is obtained from the control means; and
  the control means controls the adjustment means on the basis of the deflection amount calculated by the deflection amount calculating means, thereby adjusting the height position of the middle portion supporting means so that the height positions of both end portions of the workpiece being rotated and the height position of the middle portion thereof become the same.

3. The machining system as set forth in claim 2, characterized in that the measuring head comprises light emitting means for emitting a laser beam toward the outer peripheral surface of the workpiece, light receiving means for receiving the laser beam reflected by the outer peripheral surface of the workpiece, and distance calculating means for calculating the distance between the measuring head and the outer peripheral surface of the workpiece on the basis of received-light data of the light receiving means.

4. The machining system as set forth in claim 3, characterized in that
  the light emitting means is configured to emit a laser beam in the Y-axis direction and the measuring head is moved in the X-axis direction by the movement of the tool holding means in the X-axis direction and measures said distance at a plurality of positions in its moving direction, and
  the deflection amount calculating means calculates the center position of the workpiece on the basis of the distances calculated by the measuring head and the positions of the tool holding means when said distances were calculated which are obtained from the control means, and then calculates the deflection amount.

5. The machining system as set forth in claim 3, characterized in that the light emitting means is configured to emit a laser beam in the vertical direction and the measuring head is configured to measure the distance between the measuring head and the upper outer peripheral surface of the workpiece.

* * * * *